United States Patent Office 3,227,657
Patented Jan. 4, 1966

3,227,657
GLYCOL COATED ATTAPULGITE CLAY AND
COMPOSITIONS INCLUDING THE SAME
Walter L. Haden, Jr., Metuchen, and James A. Polon,
East Brunswick, N.J., assignors to Minerals & Chemicals Philipp Corporation, Menlo Park, N.J., a corporation of Maryland
No Drawing. Filed Sept. 20, 1962, Ser. No. 225,116
12 Claims. (Cl. 252—317)

This invention relates to a process of treating attapulgite clay so as to produce a unique coated clay product which has improved thickening powers when incorporated into polar liquids. This invention is also concerned with a process utilizing naturally occurring clay for increasing the viscosity of polar liquids, and with the products formed thereby.

Attapulgite clay is mined principally in southwest Georgia and northeast Florida and contains as its chief constituent the clay mineral attapulgite, a hydrated aluminum silicate including magnesium in the lattice. Attapulgite crystals have an acicular configuration and occur as bundles of laths, the individual laths attaining a maximum length of about 4 to 5 microns, a maximum thickness of only about 50 to 100 A., and a width ordinarily two to three times the thickness. As mined, attapulgite clay ordinarily has a volatile matter or V.M., of at least about 48 percent, volatile matter referring to the weight percent of a material eliminated by heating the mineral substantially to constant weight at 1800° F. In the case of pure clay, volatile matter is chiefly water. The free moisture (free water) content of the clay, as mined, is at least about 41 percent, free moisture (F.M.) being the weight percent of the mineral eliminated by heating the mineral substantially to constant weight at 225° F. Free moisture includes water physically bonded to the mineral and residing on the surfaces, and to some extent in the interstices between individual mineral laths. Combined water, or water of composition, accounts substantially for the difference between volatile matter and free moisture content of the clay.

One of the principal uses of attapulgite clay is in gelling aqueous liquids, as in the production of drilling muds. In preparing aqueous gels of attapulgite clay, relatively small quantities of the clay are added to an aqueous liquid and the system is agitated. Gelation of the water results from the breaking up of the bundle of attapulgite needles and the dispersion of the ultimate colloidally dimensioned particles in the water. High shear agitation must be employed to develop the optimum thickening power of the clay. Attapulgite clay is very different in its chemical and physical properties from the swelling bentonite clays which are also useful in gelling some aqueous liquids. Swelling clays are composed chiefly of a multilayer mineral and, as their name suggests, gelation of liquids with swelling bentonites results from the penetration and swelling apart of the layers of the bentonite.

Organic liquids are not so easily or economically gelled or thickened with clays, as is water. By way of example, whereas water may be gelled with only about 5 percent by weight of attapulgite clay when high shear equipment is used, the naturally occurring clay is ineffective in gelling nonpolar organic liquids, such as hydrocarbon oils. This type of clay is more readily dispersed in polar organic liquids, such as lower alcohols, ketones and similar solvents. However, the degree of dispersion of colloidal attapulgite clay in polar liquids or aqueous solutions of polar liquids is poor and the process is expensive inasmuch as relatively large quantities of attapulgite are required even when high shear agitation is employed. For example, at least twice as much attapulgite clay is required to gel either lower alcohols or glycols as is required to gel the same quantity of water to somewhat the same consistency. Other polar liquids, such as dioctylphthalate, fail to body appreciably even when very large quantities of attapulgite clay are employed.

It has been suggested to modify various normally hydrophilic clays having base-exchange capacities of at least 25 mgs./100 gm. in a manner to provide clay materials having organophilic and hydrophobic properties, as a result of which the modified clay materials are dispersible in organic liquids, especially oleaginous liquids such as petroleum hydrocarbons. It has been suggested to produce grease, for example, by dispersing the modified clay in petroleum oil. The suggested method of modifying clay having the required base-exchange capacity involves reaction in water of the clay with an onium compound (e.g., a long chain amine containing a nitrogen in pentavalent state). The reaction involves the quantitative exchange of replaceable inorganic cations of the clay with the long chain cation of the onium compound to produce an oleophilic onium-clay reaction product. The latter is then dispersed in an organic liquid to form a gel therein. It has also been suggested to improve the dispersibility of certain clays in organic liquids by merely adsorbing on the clay a hydrophobic surface active agent, especially certain cationic surface active agents.

While such processes of modifying clay to produce organophilic onium clays or surfactant coated clays and forming gels by addition thereof to certain organic liquids has met with some success, it is not entirely satisfactory when polar organic liquids are involved. The reason is that the process is expensive due to the expensive character of the surface active organic compounds employed to improve the dispersibility of the clay. Furthermore, such treated clays are relatively ineffective in gelling many polar organic liquids and are ineffective in thickening water or aqueous solutions. In many instances the presence of surface active materials in the thickened compositions is highly detrimental.

Accordingly, an object of the present invention is to provide a novel process for treating attapulgite clay to render the clay more useful in gelling polar liquids.

A further object of this invention is the provision of a versatile organic coated attapulgite clay product which is organophilic but still retains its native hydrophilic properties and is more useful than the clay per se in thickening aqueous liquids and polar organic liquids.

Another object is the provision of a method of thickening polar organic liquids with attapulgite clay without the use of surface active agents.

A further object is the provision of attapulgite clay thickened organic liquids which are free from surfactants.

Further objects and advantages will be readily apparent.

This invention results from the discovery of a simple procedure for treating attapulgite clay, involving the use of inexpensive organic compounds, hereinafter set forth, so as to change the normally hydrophilic clay into a versatile product which has organophilic (but nonoleophilic) properties without loss of its hydrophilic properties and is especially useful as an agent for thickening numerous types of polar liquids.

Stated briefly, the method of treating attapulgite clay in accordance with the present invention involves the steps of mixing naturally occurring attapulgite clay which is undried (or at best only mildly dried) with certain nonsurface active water-soluble glycols or water-soluble glycol ethers, hereinafter set forth, using at least sufficient water to provide a mixture of plastic consistency. The mixture is agitated to provide a homogeneous or uniform mass and substantially all of the water is then evaporated from the mass at a temperature below which the glycol or glycol ether is appreciably volatile. The dried mass is then ground to obtain the finely divided glycol coated attapulgite clay product.

From this brief description of the process for preparing a novel coated attapulgite product, it is apparent that an essential feature of the procedure involves continuously maintaining a polar liquid film in direct contact with individual attapulgite particles throughout the coating process so as to prevent agglomeration of these particles, as would occur in the absence of the polar liquid film. Initially, the polar liquid film is water, thereafter a water-glycol (or water-glycol ether) solution and, as the water content of the liquid medium surrounding attapulgite particles is reduced by evaporation, the glycol (or glycol ether) becomes the polar agent coating the particles. It has been found that it is essential to the provision of a coated attapulgite product which will satisfactorily thicken polar organic liquids that the clay particles be continuously filmed in this manner during coating. More particularly, it has been discovered that when attapulgite clay is initially dried to eliminate free moisture, but not combined water, and the diol merely impregnated on the dried clay, the resultant coated clay product is not effective as a thickening agent for polar organic liquids. Attapulgite treated in accordance with the latter procedure is difficult to disperse into colloidally dimensioned particles in organic liquids. The observation indicates that the process of the present invention affords a means of coating individual attapulgite particles while preventing irreversible agglomeration of those particles during the coating process.

The specific diol that is selected to coat the attapulgite clay is one which is soluble or miscible in the polar liquid to be thickened. In thickening the liquid with the glycol coated attapulgite particles, the ground coated clay particles are added to the liquid and the resultant mixture is agitated or sheared to effect the desired colloidal dispersion of the attapulgite particles in the liquid.

An important use of the glycol coated attapulgite clay of this invention is in the gelation of polar organic solvents, e.g., paint, varnish and lacquer removers, which are frequently thickened to improve their covering power and to facilitate their application to vertical surfaces. Still other gelled organic liquids which may be prepared with the glycol coated attapulgite clay product of this invention are printing ink bases or suspending vehicles for pigments in paints. The coated clay may be used as a flatting agent for lacquers. The glycol coated clay is also useful in preparing organogels useful in the pharmaceutical industry, such as glycerogels, or gels useful as emollient or demulcent bases in internal medicines, therapeutic creams, cosmetic creams, dentifrices and the like.

The coated clay product can be employed to gel water, aqueous salt solutions, as well as aqueous solutions of polar organic liquids. In aqueous systems, the coated clay product is more effective in effecting gelation than the uncoated clay and the quantity of coated clay required to thicken aqueous liquids to a given consistency will be appreciably less than the quantity of uncoated clay that would be required when conventional low shear rate or moderate shear rate equipment (such as a propeller-type mixer) is used. In other words, in aqueous systems the glycol treated attapulgite clay is more readily dispersed than the uncoated clay. The coated clay product of this invention is not, however, especially suitable for the thickening of nonpolar liquids, such as certain petroleum oils.

The attapulgite clay employed as a starting material in producing the coated clay product is preferably raw clay, that is, clay which has received no preliminary treatment. If desired, the clay may be one that has been mildly dried to a V.M. not less than about 18 to 20 percent, although the undried clay which usually has a V.M. of 48 percent or more is preferred. Clay which has been dried to a V.M. less than about 18 to 20 percent undergoes irreversible impairment of its colloidal properties as a result of aggregation of the mineral particles during drying. The presence of substantial native free moisture in the starting clay is an essential feature of the process of the invention, as has been mentioned above, and optimum results are realized when all of the native free moisture is present. Attapulgite clay which has been previously dispersed in water for the purpose of degritting the clay (or other reasons) and then dried can be used provided that at no point in the processing has such clay been dried to a V.M. less than about 18 to 20 percent. Attapulgite which has been previously dispersed in water containing a small amount of a dispersing agent such as, for example, tetrasodium pyrophosphate and then dried without removing the dispersant, may also be employed provided the clay has never been dried to a V.M. less than about 18 to 20 percent.

The nonsurface active organic compound employed to coat the clay is one which is soluble or miscible in water, preferably in all proportions, has a lower vapor pressure than water and contains a hydrocarbon chain of sufficient length so that the ultimate coated clay product possesses the desired dispersibility in polar organic liquids. Suitable organic compounds may be normally liquid or solid and include: water-soluble monomeric aliphatic diols (i.e., glycols) having at least 3 carbon atoms per molecule, such as propylene glycol, 1,3-butadenediol, 1,5-pentanediol, 2,5-hexanediol, 2-methyl-2,4 pentanediol, and 2,4-heptanediol; also, water-soluble monomeric aliphatic ethers of glycols, which ethers contain at least 3 carbon atoms per molecule, such as the methyl, ethyl, propyl and butyl ethers of ethylene glycol, the dimethyl, diethyl, dipropyl and dibutyl ethers of ethylene glycol, the dimethyl, diethyl, dipropyl and dibutyl ethers of diethylene glycols, thiodiethylene glycol, dichlorodiethyl diether, triethylene glycol monoethyl ether, triethylene glycol sec-ethyl ether, propylene glycol monoethyl ether and propylene glycol monoethyl ether. Especially suitable from the standpoint of performance and effectiveness are the water-soluble nonsurface active polymers of ethylene glycol or water-soluble nonsurface active polymers of propylene glycol, including the lower polymers such as triethylene glycol and dipropylene glycol, as well as high polymers which, in the case of ethylene glycol polymers, are water soluble up to molecular weights as high as 6000 or in the case of propylene glycol polymers are water soluble up to molecular weights of about 500. Surface active mixed polymers of ethylene glycol and propylene glycol are outside the scope of this invention, an essential feature of which resides in the use of a nonsurface active organic coating material with clay.

In putting the invention into practice, water is incorporated with a mixture of suitable glycol or glycol ether and colloidal clay in an amount at least sufficient to provide a mixture of plastic consistency, usually a mixture having a total V.M. (inclusive of glycol) of at least about 55 percent. When employing the glycol in amount of 20 to 50 percent of the clay weight to produce a material suitable for gelling polar organic liquids, mixtures having a total V.M. of at least about 65 percent are prepared. If desired, more dilute mixtures may be prepared, such as mixtures having a V.M. as high as 200 percent or more. The order in which the ingredients are added is immaterial. The quantity of glycol or glycol ether that is employed with the clay will depend upon whether the coated clay is intended for use in bodying aqueous liquids or organic liquids. To body aqueous liquids, the glycol can be employed in very small amount, from about ½ to about 5 percent, based on the V.F. weight of the clay. Larger quantities of coating agent may be used when thickening other polar liquids. In gelling polar organic solvents such as alcohols, ketones and glycols, the glycol or glycol ether coating material is employed in an amount within the range of about 20 to 50 percent, and preferably about 25 to 30 percent, based on the V.F. weight of the clay. The term "V.F. clay weight" refers to the volatile free weight of the clay which is the weight of the clay after being heated to constant weight at 1800° G. When the glycol or glycol ether is employed in an amount less than about 20 percent of the V.F. clay weight, the coated clay will not be as effective in thickening organic solvents as clay coated with larger quantities of glycol or glycol ether. The use of coating agent in amount in excess of 50 percent of the V.F. clay weight will be wasteful since some of the glycol (or ether) will have to be evaporated from the clay to provide the desired product in the form of a finely divided solid material.

The type of equipment in which the clay, glycol and water are mixed will depend to a large extent on the total V.M. of the mixture. A pug mill is suitable for plastic mixtures whereas agitated vessels are suitable for more fluid mixtures. The ingredients are mixed sufficiently to provide a mass which is apparently homogeneous. Water is then evaporated substantially completely from the homogeneous mass. Any suitable drying equipment may be used and, if desired, the mass may be spray dried. Inasmuch as the polyols employed in carrying out this invention have a higher boiling point than water at atmospheric pressure, evaporation may be conducted at normal pressure. If desired, evaporation may be at reduced pressure, provided that the polyol has a low vapor pressure at the reduced pressure. Water may remain in the product if the glycol or glycol ether is one which forms a constant boiling mixture with water and the pressure on the system may be reduced or increased, as required, to eliminate residual water. In many instances the presence of water in the coated clay product in small quantities (such as 1 to 5 percent of the V.F. clay weight) will produce no harmful effects.

The dried product is then ground, usually to 100 percent minus 325 mesh, in any suitable mill. If the mixture has been spray dried, grinding may be dispensed with.

Polar organic liquids which may be bodied or gelled by dispersion therein of the glycol or glycol ether coated clay of this invention include: mono and polyhydric alcohols, ketones, esters and glycol ethers, mixtures therebetween or mixtures with minor amounts of water or non-polar organic liquids. Typical monohydric alcohols include ethanol, propanol, isopropanol, n-butanol, isobutanol; ketones include acetone, methyl ethyl ketones, methyl isobutyl ketone, mesityl oxide, diacetone alcohol; esters include butyl acetate, methyl, ethyl, isopropyl or amyl acetate, ethylene glycol monomethyl ether acetate, dioctylphthalate and monobutyl ether acetate. Liquid polyhydric alcohols of particular use in forming the continuous phase of the dispersion include glycerol, ethylene glycol, propylene glycol, trimethylene glycol, diethylene glycol and dipropylene glycol. Another useful class of organic vehicles in which the coated clay can be dispersed is that of glycol ethers which include ethylene glycol monoethyl ether, ethylene glycol monobutyl ether, ethylene glycol dimethyl ether, diethylene glycol dibtuyl ether, diethylene glycol ethyl ether acetate, thiodiethylene glycol, dichlorodiethyl diether, triethylene glycol, triethylene glycol monomethyl ether, triethylene glycol monoethyl ether, triethylene glycol sec-ethyl ether, propylene glycol ene glycol dimethyl ether, diethylene glycol dibutyl ether, Also, polyoxyalkylene glycols, linseed oil, naphthenic oils, certain halogenated hydrocarbons, such as ethylene dichloride and 1,1,2-trichloroethane. The aforementioned polar organic liquids are illustrative only, for many other liquids as well as heat-liquifiable polar organic solids may be gelled or thickened with the coated clay. In gelling normally solid polar compounds, the solid is liquified by application of heat thereto prior to the dispersion of the coated clay therein.

If the preparation of dispersions of the coated clay in organic liquids from about 1 to 50 parts of coated clay to 100 parts of organic liquid may be used. Organogels usually will be made up with from 10 to 15 parts of coated clay to 100 parts of organic liquid. High shear agitation will give best results in thickening of polar organic liquids with the clay product of this invention.

As mentioned above, the hydrophilic organic coated clay material is also useful in thickening or gelling aqueous liquids since the coated clay is more easily dispersed in aqueous liquids than the uncoated clay. Mere mild agitation of the coated clay in the aqueous liquid will thicken the liquid to viscosities normally obtainable only by the use of high shear equipment, such as, for example, a colloid mill. The aqueous liquid can contain dissolved salt material since dispersions of attapulgite clay are stable in the presence of ionized salt maerial. In bodying aqueous liquids with the coated clay, about 3 to 10 parts of the coated clay is used with about 100 parts of aqueous liquid.

The following examples are given to illustrate more fully the invention and are not to be construed as limiting the scope thereof. In examples, all parts are parts by weight unless otherwise indicated.

EXAMPLE I

This example illustrates the preparation of diethylene glycol coated attapulgite clay in accordance with the present invention. The starting clay was a hydraulically refined attapulgite clay from a deposit near Attapulgus, Georgia. The clay was precoated with about 0.1 percent by weight of tetrasodium pyrophosphate dispersant. The analysis of the starting clay, on a volatile free basis, was as follows:

| | Percent by weight |
|---|---|
| $SiO_2$ | 67.0 |
| $Al_2O_3$ | 12.5 |
| MgO | 11.0 |
| $Fe_2O_3$ | 4.0 |
| CaO | 2.5 |
| Others | 3.0 |

The V.M. of the starting clay was 35 percent.

Seventy-two parts by weight of this clay was slurried with 330 parts of water and 20 parts by weight of diethylene glycol was added. The mixture was agitated in a high shear mixer, then dried in an oven held at 220° F. for 16 hours and crushed to 100 percent minus 325 mesh. The resultant product had a V.M. of 31.8 percent and a free moisture content of 3.5 percent. Extrapolation of this data gives the following composition of the glycol coated attapulgite clay:

| | Percent |
|---|---|
| Ash | 68.2 |
| Diethylene glycol | 20.8 |
| Free moisture | 3.5 |
| Combined water | 7.5 |

EXAMPLE II

This example illustrates the gelation of diethylene glycol with the diethylene glycol coated attapulgite clay product of Example I. 150 parts by weight of diethylene glycol was gelled to a ½-cone penetration value of 209 by shearing with 29 parts by weight of the product of Example I in a Waring Blendor. It was found that the same quantity (V.F. basis) of uncoated colloidal attapulgite clay would not gel diethylene glycol. ½-cone penetration values are determined by the method of Holten and Kibler which is described in Analytical Chemistry, vol. 22, page 1574 (1950).

EXAMPLE III

Experiments were conducted to demonstrate that appreciably smaller quantities of colloidal attapulgite clay will gel isopropanol when the clay has been previously coated in accordance with the present invention. Technical isopropanol was gelled to ½-cone penetration values of 205–210 with (1) the starting clay of Example I and (2) the starting clay of Example I which was coated with diethylene glycol by mixing 25 parts of diethylene glycol with 500 parts of an aqueous slurry containing 80 parts of clay having a V.M. of 35 percent, drying the slurry to a V.M.

of 46 percent and a free water content of 13.3 percent and crushing the dried material to 100 percent minus 325 mesh.

Dispersions of clay in the solvent were prepared in a Waring Blendor. The results are tabulated below.

*Composition of isopropanol gels formulated with attapulgite clay*

|  | Wt. Percent | |
| --- | --- | --- |
| Isopropanol | 71.0 | 82.6 |
| Attapulgite clay (uncoated), 35% V.M. | 29.0 | |
| Attapulgite clay (uncoated), V.F. basis | 18.9 | |
| Diethylene glycol coated attapulgite clay, 46% V.M. | | 17.4 |
| Diethylene glycol coated attapulgite clay, V.F. basis | | 9.4 |
| ½-cone penetration value | 205 | 210 |

The results show that about twice as much of the uncoated attapulgite clay (V.F. basis) was required to produce an isopropanol gel of the same consistency as the isopropanol gel formulated with the diethylene glycol coated clay of the invention.

EXAMPLE IV

Example III was repeated using diethylene glycol as the continuous phase of the gel in lieu of isopropanol, with the following results:

*Composition of diethylene glycol gels formulated with attapulgite clay*

|  | Wt. Percent | |
| --- | --- | --- |
| Diethylene glycol | 69.2 | 83.3 |
| Attapulgite clay (uncoated), 35% V.M. | 30.8 | |
| Attapulgite clay (uncoated), V.F. basis | 20.0 | |
| Diethylene glycol coated attapulgite clay, 46% V.M. | | 16.7 |
| Diethylene glycol coated attapulgite clay, V.F. basis | | 9.0 |
| ½-cone penetration value | 169 | 177 |

The results show that although twice as much V.F. clay was employed, the diethylene glycol vehicle was not as thick when uncoated cololidal attapulgite clay was employed as when the glycol coated clay was used. In effect, the attapulgite clay was twice as effective in gelling the diethylene glycol vehicle when the clay had been precoated with glycol.

EXAMPLE V

The diethylene glycol coated colloidal attapulgite clay of Example I was employed to gel methyl isobutyl ketone, a solvent which cannot be gelled by uncoated colloidal attapulgite clay without using a hydrophobic surfactant, such as an amine surfactant. A gel was prepared by dispersing 14.9 parts by weight of the diethylene glycol coated colloidal clay of Example I in 85.1 parts by weight of methyl isobutyl ketone. A Waring Blendor was employed in producing the gel.

EXAMPLE VI

To demonstrate the advantage of employing small quantities of glycol coating agent with colloidal attapulgite clay in the thickening of aqueous systems with the clay, aqueous attapulgite clay dispersions were prepared, with and without glycol coating agent for the clay.

The control clay thickening agent was an extruded colloidal grade of attapulgite clay from a deposit near Attapulgus, Georgia. The raw clay, as mined, was crushed, pugged with water to an extrudable consistency (V.M. of about 58%), the extruded pellets dried at a product temperature below about 250° F. and ground to about 98 percent minus 200 mesh (Tyler). The V.M. of the ground clay product was 25 percent.

Samples of colloidal attapulgite clay containing various water-soluble glycols were made from the starting clay used in making up the control clay and by the same procedure, modified by dissolving the glycol into the water with which the clay was pugged. Glycols were used in amount of 5 percent of the V.F. clay weight. The pugged clay containing glycol solution was extruded at 58 percent V.M., dried to V.M. levels of 20 percent to 25 percent, ground to 98 percent minus 200 mesh and screened. The drying operation was carried out at a pellet temperature below about 220° F.

Evaluations of the viscosity of the various clay samples in water were made by the following technique:

Clay was pregelled in water at the 15 percent level (15 parts by weight of attapulgite clay or clay and glycol, volatile free clay basis, to 85 parts by weight of water) in a malted milk type agitator equipped with a corrugated disc propeller (Hamilton Beach, Model 40DM) operated at 14,000 r.p.m. with 5 minutes stirring. The pregelled material was diluted to the 5 percent level (5 parts of volatile free clay or clay plus glycol to 95 parts of remaining ingredients) with one minute mixing in a Waring Blendor operated at low speed. Dispersions were evaluated immediately after preparation with the Brookfield viscometer (#2 spindle) at ½ r.p.m.

*Effect of glycols on water thickening properties of attapulgite clay*

| Composition of Thickening Agent | Viscosity of 5% Dispersions of Thickening Agent in Distilled Water, Cp. |
| --- | --- |
| Clay Coating: | |
| None | 15,200 |
| Ethylene glycol | 30,400 |
| Diethylene glycol | 24,000 |
| Triethylene glycol | 18,400 |
| Methoxy triglycol | 21,000 |
| Propylene glycol | 20,000 |
| Polyoxyethylene polymer (Carbowax 200) | 21,600 |

The data show that aqueous dispersions of the glycol treated clays were more viscous than dispersions of the clay per se.

We claim:

1. A method of treating attapulgite clay to improve the dispersibility of the clay in polar liquids which comprises forming a mixture of attapulgite clay which contains all of its native water of crystallization and at least a major part of its native free moisture with from ½ to 50 percent, based on the volatile free weight of said clay, of at least one organic compound hereafter set forth and water in amount at least sufficient to form a mixture of plastic consistency, said organic compound being selected from the group consisting of: a water-soluble monomeric glycol having at least 3 carbon atoms per molecule, a water-soluble aliphatic ether of a monomeric glycol, water-soluble polyethylene glycol, and water-soluble polypropylene glycol, agitating the mixture to form an apparently homogeneous mass whereby individual attapulgite particles become separated by an aqueous solution of said organic compound and evaporating substantially all of the free moisture from said mixture at a temperature below which said organic compound has appreciable vapor pressure, whereby said organic compound replaces free moisture originally associated with individual attapulgite clay particles.

2. The method of claim 1 wherein said organic compound is diethylene glycol.

3. A method of treating attapulgite clay to improve the dispersibility of the clay in polar liquids which comprises forming a mixture of attapulgite clay which contains all of its native water of crystallization and at least a major part of its native free moisture with from 20 to 50 percent, based on the volatile free weight of said clay, of at least one organic compound hereafter set forth and water in amount at least sufficient to form a mixture of plastic consistency, said organic compound being selected from the group consisting of: a water-soluble monomeric glycol having at least 3 carbon atoms per molecule, a water-soluble aliphatic ether of a monomeric glycol, water-soluble polyethylene glycol, and water-soluble polypropylene glycol, agitating the mixture to form an apparently homogeneous mass whereby individual attapulgite particles become separated by an aqueous solution of said organic compound and evaporating substantially all of the free moisture from said mixture at a temperature below which said organic compound has appreciable vapor pressure, whereby said organic compound replaces free moisture originally associated with individual attapulgite clay particles.

4. A method of treating attapulgite clay to improve the dispersibility of the clay in polar solvents which comprises forming a mixture of raw attapulgite clay with from about ½ to 50 percent, based on the volatile free weight of said clay, of at least one organic compound hereafter set forth and water sufficient to provide a mixture having a volatile matter content of at least about 55 percent, said organic compound being selected from the group consisting of: a water-soluble monomeric glycol having at least 3 carbon atoms per molecule, a water-soluble aliphatic ether of a monomeric glycol, water-soluble polyethylene glycol and water-soluble polypropylene glycol, agitating the mixture to form an apparently homogeneous mass whereby individual attapulgite particles become separated by an aqueous solution of said organic compound and evaporating substantially all of the free moisture from said mixture at a temperature below which said organic compound has appreciable vapor pressure, whereby said organic compound replaces free moisture originally associated with individual attapulgite clay particles.

5. The method of claim 4 in which said glycol is diethylene glycol.

6. A method of treating attapulgite clay to improve the dispersibility of the clay in polar solvents which comprises forming a mixture of raw attapulgite clay with from about 25 to 30 percent, based on the volatile free weight of said clay, of at least one organic compound hereafter set forth and water sufficient to provide a mixture having a volatile matter content of at least 65 percent, said organic compound being selected from the group consisting of: a water-soluble monomeric glycol having at least 3 carbon atoms per molecule, a water-soluble aliphatic ether of a monomeric glycol, water-soluble polyethylene glycol and water-soluble polypropylene glycol, agitating the mixture to form an apparently homogeneous mass whereby individual attapulgite particles become separated by an aqueous solution of said organic compound and evaporating substantially all of the free moisture from said mixture at a temperature below which said organic compound has appreciable vapor pressure, whereby said organic compound replaces free moisture originally associated with individual attapulgite clay particles.

7. Attapulgite clay, the individual colloidally dimensioned particles of which contain substantially all of their native water of hydration and have native free moisture replaced with from ½ to 50 percent, based on the volatile free weight of said clay, of at least one organic compound selected from the group consisting of: a water-soluble monomeric glycol having at least 3 carbon atoms per molecule, a water-soluble aliphatic ether of a monomeric glycol, water-soluble polyethylene glycol and water-soluble polypropylene glycol.

8. Attapulgite clay, which is substantially free from free moisture and contains substantially all of its native water of hydration, the individual particles of said clay being uniformly coated with from 25 to 30 percent, based on the volatile free weight of said clay, of at least one organic compound selected from the group consisting of: a water-soluble monomeric glycol having at least 3 carbon atoms per molecule, a water-soluble aliphatic ether of a monomeric glycol, water-soluble polyethylene glycol and water-soluble polypropylene glycol.

9. A gelled composition consisting essentially of a liquid polar organic solvent having the attapulgite clay product of claim 8 dispersed therein in amount sufficient to impart a gelled structure to said solvent, said solvent being one in which said organic compound replacing free moisture of said clay is soluble and being selected from the group consisting of a monohydric alcohol, polyhydric alcohol, ketone, ester, glycol ether and aqueous solutions thereof.

10. A gelled composition comprising water having the attapulgite clay product of claim 7 dispersed therein in amount sufficient to impart a gelled structure thereto, said attapulgite clay product of claim 7 containing from ½ to 5 percent, based on the volatile free weight of said clay, of said organic compound.

11. A finely divided agent for thickening polar organic liquids and consisting of attapulgite clay which contains substantially all of its native water of hydration and has free moisture replaced with from ½ to 50 percent, based on the volatile free weight of said clay, of diethylene glycol.

12. The composition of claim 8 in which said organic compound is diethylene glycol.

References Cited by the Examiner

UNITED STATES PATENTS

| | | | |
|---|---|---|---|
| 2,864,717 | 12/1958 | Lyons | 106—287 |
| 2,864,718 | 12/1958 | Lyons | 106—287 |
| 2,940,938 | 6/1960 | Blinka | 252—309 |
| 3,032,431 | 5/1962 | Ferrigno | 106—308 |
| 3,041,238 | 6/1962 | Allegrini | 167—55 |
| 3,132,958 | 5/1964 | Hemwall | 106—84 |

FOREIGN PATENTS 784,659  10/1957  Great Britain.

OTHER REFERENCES

Brown: Quarterly Journal of Pharmacy and Pharmacology, vol. 8 (1935), pp. 390–397.

JULIAN S. LEVITT, *Primary Examiner.*

FRANK CACCIAPAGLIA, JR., *Examiner.*